United States Patent
Roskosch et al.

(10) Patent No.: US 9,460,324 B2
(45) Date of Patent: Oct. 4, 2016

(54) GENERATION OF TRIGGER EVENTS BY RFID LABELS

(71) Applicant: SIEMENS AKTIENGESELLSCHAFT, München (DE)

(72) Inventors: Richard Roskosch, Ottobrunn (DE); Claus Seisenberger, Neufrannhofen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 111 days.

(21) Appl. No.: 14/378,593

(22) PCT Filed: Feb. 15, 2013

(86) PCT No.: PCT/EP2013/053110
§ 371 (c)(1),
(2) Date: Aug. 13, 2014

(87) PCT Pub. No.: WO2013/131734
PCT Pub. Date: Sep. 12, 2013

(65) Prior Publication Data
US 2015/0028999 A1    Jan. 29, 2015

(30) Foreign Application Priority Data
Mar. 7, 2012  (DE) .................. 10 2012 203 550

(51) Int. Cl.
G06K 7/10 (2006.01)
G06K 19/07 (2006.01)

(52) U.S. Cl.
CPC ....... G06K 7/10198 (2013.01); G06K 7/10158 (2013.01); G06K 7/10356 (2013.01); G06K 19/0716 (2013.01)

(58) Field of Classification Search
CPC ........ G02B 7/02; G02B 7/023; G02B 27/64; G02B 27/646; G03B 5/00; G03B 3/10; F03G 7/06; G06K 7/10198; G06K 7/10356; G06K 7/10158; G06K 19/0716
USPC ............ 340/10.1–10.6, 572.1–572.9; 60/527
See application file for complete search history.

(56) References Cited

U.S. PATENT DOCUMENTS

| | | | |
|---|---|---|---|
| 5,952,922 A | 9/1999 | Shober | |
| 7,400,248 B2 | 7/2008 | Yarvis | 340/539.26 |
| 2004/0193020 A1 | 9/2004 | Chiba et al. | |
| 2005/0248455 A1* | 11/2005 | Pope | G01K 1/024 340/539.27 |

(Continued)

FOREIGN PATENT DOCUMENTS

| | | | |
|---|---|---|---|
| CN | 101036154 A | 9/2007 | G06K 17/00 |
| DE | 102012203550.8 | 3/2012 | |

(Continued)

OTHER PUBLICATIONS

English translation of Austrian Patent Publication 010520 U2 dated Jun. 15, 1902.

(Continued)

*Primary Examiner* — Brian Wilson
(74) *Attorney, Agent, or Firm* — Slayden Grubert Beard PLLC

(57) ABSTRACT

In an apparatus and by a method for detecting a tag having a transponder for identification by electromagnetic waves (RFID), a synchronization unit is electromagnetically coupled to the transponder and outputs a trigger signal for activating a supplementary system based on the occurrence of data interchange with the transponder. Any desired devices can therefore be easily activated and uniquely identified using an identification number of the transponder.

22 Claims, 2 Drawing Sheets

(56) References Cited

U.S. PATENT DOCUMENTS

| | | |
|---|---|---|
| 2006/0186997 A1 | 8/2006 | Ostertag et al. |
| 2007/0132587 A1 | 6/2007 | Smith et al. |
| 2007/0241904 A1 | 10/2007 | Ozaki et al. |
| 2007/0273507 A1 | 11/2007 | Burchell et al. |
| 2009/0289776 A1* | 11/2009 | Moore ................ G06K 7/0008 340/10.41 |

FOREIGN PATENT DOCUMENTS

| | | |
|---|---|---|
| JP | 2003-144417 | 5/2003 |
| JP | 2003-158470 | 5/2003 |
| JP | 2006-507587 | 3/2006 |
| JP | 2007-292744 | 11/2007 |
| WO | 03/067396 A2 | 8/2003 |

OTHER PUBLICATIONS

International Search Report for PCT/EP2013/053110 dated Jun. 5, 2013.

Chinese Office Action, Application No. 201380013017.4, 12 pages, May 4, 2016.

\* cited by examiner

GENERATION OF TRIGGER EVENTS BY RFID LABELS

CROSS REFERENCE TO RELATED APPLICATIONS

This application is the U.S. national stage of International Application No. PCT/EP2013/053110, filed Feb. 15, 2013 and claims the benefit thereof. The International Application claims the benefit of German Application No. 102012203550.8 filed on Mar. 7, 2012, both applications are incorporated by reference herein in their entirety.

BACKGROUND

Described below are an apparatus and a method for detecting a label or tag for identification by electromagnetic waves (RFID), for example for marking and identifying an object, with a reader which uses a frequency band and is intended to interchange data with the tag having a transponder and to supply energy to the transponder.

When using wireless sensors, it is important to be able to uniquely assign the measured values from the individual sensors to a sensor number and therefore to a location. In many cases, it would be desirable to be able to use RFID labels for this purpose, which labels are often already used in the logistics sector. It is often also necessary to identify goods and to additionally acquire sensor data relating to the latter.

A further problem is the determination of the distance of RFID labels or RFID tags in order to locate the associated goods. For this purpose too, it may be advantageous to control an additional backscatter modulator, for example, in synchronism with an RFID label and therefore to obtain the assignment of the distance value to the identification or to the identification number of the corresponding label.

Since RFID labels, which are transponders, are used in different embodiments and likewise from various manufacturers, a comprehensive solution is sought which operates with RFID labels from different manufacturers and does not presuppose any modification of a given RFID label.

There are wireless sensors programmed with their own identification (ID) that cannot be read using conventional RFID systems. Separate management of RFID systems and sensor systems is therefore conventionally necessary. In situations in which both an RFID functionality and a wireless sensor function are required on the same goods item or object, both identification numbers must usually be assigned manually, thus producing a considerable error source.

SUMMARY

Described below are an apparatus and a method for detecting a label or tag for identification by electromagnetic waves (RFID) in such a manner that data interchange between a reader and a transponder of the label triggers or switches additional processes in the environment of the label without modifying the label. The intention is to easily activate any desired supplementary systems and to link them to data from the transponder.

A first aspect provides an apparatus for detecting a tag having a transponder for identification by electromagnetic waves (RFID), having a reader which is electrically connected to a first antenna and is intended to supply energy to the transponder having a second antenna electromagnetically coupled to the first antenna and to interchange data with the transponder. A synchronization unit which is electrically connected to a third antenna electromagnetically coupled to the second antenna and outputs a trigger signal for a supplementary system on the basis of the occurrence of the data interchange additionally detected using the third antenna is additionally provided.

According to a second aspect, a method for detecting a tag having a transponder for identification by electromagnetic waves (RFID) is carried out as follows. Energy is supplied to the transponder having a second antenna electromagnetically coupled to a first antenna using a reader electrically connected to the first antenna, and data are interchanged with the transponder using the reader. The method is distinguished by the fact that a synchronization unit which is electrically connected to a third antenna electromagnetically coupled to the second antenna and outputs a trigger signal for a supplementary system on the basis of the occurrence of the data interchange additionally detected using the third antenna is provided.

A synchronization unit is electromagnetically coupled to the antenna or coil of the RFID tag. Therefore, there is no need for an electrical connection to the RFID chip. The synchronization unit can therefore also be subsequently combined with virtually any desired RFID tags. A tag can additionally be mechanically coupled to the supplementary system in order to easily and uniquely assign its identification number (ID) to the system.

A method is carried out in which backscatter modulation of the RFID label or RFID tag can be additionally "eavesdropped" as it were, for example during the querying process by the reader, via the electromagnetic coupling between the RFID tag and the synchronization unit.

In addition to being detected at the RFID reader, the backscatter signal from RFID tags is particularly advantageously detected using an antenna or coil of a synchronization unit. In this manner, there is no need for any additional control signal of the RFID tag, as a result of which a supplementary system can fundamentally be combined with all RFID labels or RFID tags already on the market.

According to one advantageous refinement, the synchronization unit can additionally acquire the data interchange contents using the third antenna and can alternatively or cumulatively output the trigger signal on the basis of the data interchange contents. This makes it possible to additionally adapt the synchronization unit to a given RFID tag.

According to another advantageous refinement, the supplementary system, during output of the trigger signal, can generate data which can be acquired by the reader in addition to data from the transponder, for example an identification number of the transponder.

According to another advantageous refinement, the transponder and the supplementary system can be mechanically fixed to one another. A unique assignment is thus provided.

According to another advantageous refinement, the supplementary system may have a sensor device which, during output of the trigger signal, can transmit sensor data to the reader using the third antenna.

According to another advantageous refinement, the sensor data can be transmitted to the second antenna and then to the first antenna using the third antenna.

According to another advantageous refinement, the supplementary system, during output of the trigger signal, can introduce additional modulation for determining a distance to the reader using the third antenna. The distance to be determined may be, for example, the distance between the supplementary system or the transponder and the reader.

According to another advantageous refinement, the additional modulation may be introduced to the second antenna and then to the first antenna using the third antenna. In this manner, the third antenna needs to be tuned only to the second antenna.

According to another advantageous refinement, the synchronization unit can output the trigger signal in synchronism with or at the same time as the data interchange.

According to another advantageous refinement, the synchronization unit can output the trigger signal in a delayed manner with respect to the data interchange. This makes it possible to activate supplementary systems according to the given requirements.

According to another advantageous refinement, the synchronization unit may have a diode detector, the signal from which can be sampled using an analog/digital converter. This arrangement can be used to detect the backscatter modulation of an RFID tag. This makes it possible to determine the activity time of the label or tag and the data contents thereof. The data contents can be processed further by the supplementary system in a particularly advantageous manner.

According to another advantageous refinement, the data interchange is reading of the transponder. The ID of the tag can be read and assigned to the supplementary system in a particularly advantageous manner.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
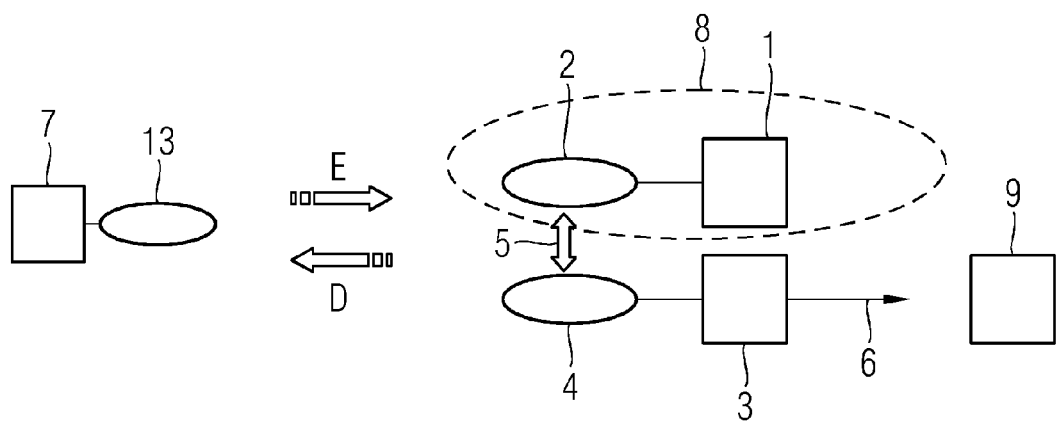
FIG. 1 is a block diagram of a first exemplary embodiment of an apparatus for generation of trigger events by RFID labels.

Reference will now be made in detail to the preferred embodiments, examples of which are illustrated in the accompanying drawings, wherein like reference numerals refer to like elements throughout.

FIG. 1 shows a first exemplary embodiment of an apparatus for detecting a tag having a transponder 8 for identification by electromagnetic waves (RFID). The transponder 8 is a component which is provided, as standard, as a functional and packaged unit and can be fixed to a product, object or supplementary system 9, for example for the purpose of identification by a unique identification number (RF-ID). The housing of the transponder 8 contains substantially the subcomponents of a second antenna 2 and an RFID circuit 1 electrically connected thereto. A reader 7 has a first antenna 13. The first antenna 13 is electromagnetically coupled to the second antenna 2 in the transponder 8. The transponder 8 is supplied with energy E by the electromagnetic coupling and data D can be read from the transponder 8, for example by backscatter modulation. General data interchange with the transponder 8 is possible in principle. A third antenna 4 is likewise coupled to the second antenna 2 by electromagnetic coupling 5. A synchronization unit 3 is electrically connected to the third antenna 4, the synchronization unit 3 outputting a trigger signal 6 for activating a supplementary system 9 on the basis of the data interchange or reading detected using the third antenna 4. One antenna 2, 4 or 13 may be in the form of a coil in principle. A reader 7 may likewise be a writing device in principle. A further process can be started in synchronism with or in a delayed manner with respect to the transmission of an RFID tag, which process can be assigned an identification number or ID of the RFID tag in this manner. In order to obtain a unique assignment between a distance measurement signal and the associated RFID number, for example, a synchronization unit 3 is fitted to the RFID tag. This synchronization unit 3 detects the activity state of the RFID tag and in this manner may start a second process, for example, in synchronism with the transmission of the RFID number, such as the switching-on of an additional signal for distance measurement. For example, after the RFID label has been queried, additional modulation can be introduced during the querying process by transformer-based coupling to the RFID reader 7, which additional modulation can be used to determine the instantaneous distance between the RFID reader 7 and the transponder 8. This makes it possible to locate the transponder 8.

Figure 2:
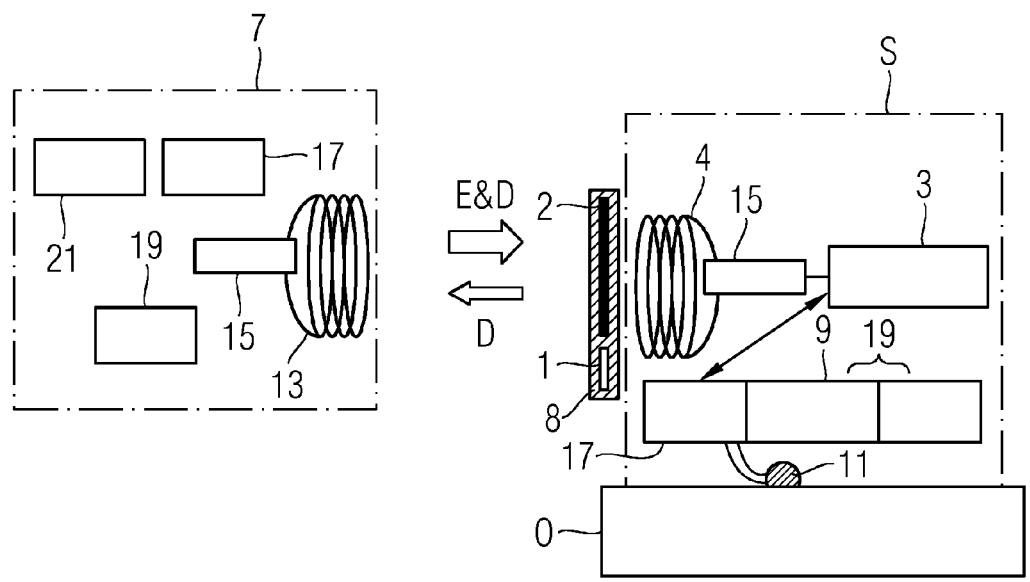
FIG. 2 is a block diagram of a second exemplary embodiment of an apparatus for generation of trigger events by RFID labels.

FIG. 2 shows a second exemplary embodiment of an apparatus. The second exemplary embodiment is illustrated in the form of a block diagram. The second exemplary embodiment shows a radio sensor S which is equipped with an RFID label and is intended to record temperature values using a temperature sensor 11 as an exemplary embodiment of a sensor device. A coin-shaped transponder 8 is supplied with energy E using the RFID reader 7. This transponder 8 has an RFID circuit 1 electrically connected to a second antenna 2 in a housing and transmits its data contents D to the RFID reader 7 by transformer-based coupling. Both the querying process and the data contents of the RFID label are recorded using the antenna coil 4 which is arranged in the sensor S behind the transponder 8. After the RFID label has been queried, for example, the sensor S can now transmit the temperature value to the RFID reader 7 likewise by transformer-based coupling. This makes it possible to uniquely identify the sensor S using the identification number of the RFID. The reader 7 is electrically connected to a first antenna 13 which can be positioned in the reader 7 and can transmit data to a LAN interface 21 using an LF (low-frequency) interface 15 and a microcontroller 17. A power supply device 19 for supplying power to the components is additionally provided in the reader 7. The transponder 8, which has an RFID circuit 1 and an antenna 2, is assigned to a sensor S which is electromagnetically coupled to the tag using a third antenna 4. A synchronization unit 3 is electromagnetically coupled to the tag using a low-frequency (LF) interface 15. The synchronization unit 3 interchanges data with a microcontroller 17, with the result that temperature values of an installation part or object 0 are recorded using the temperature sensor 11 and are supplied, as data D, to the reader 7 during reading via the third antenna 4 and the second antenna 2 of the transponder 8 by the synchronization unit 3 and the interface 15. The supplementary system 9 comprises a sensor device having the microcontroller 17 which records sensor values of the temperature sensor 11 and is supplied with energy by a power supply 19, including power supply electronics and a battery.

Figure 3:
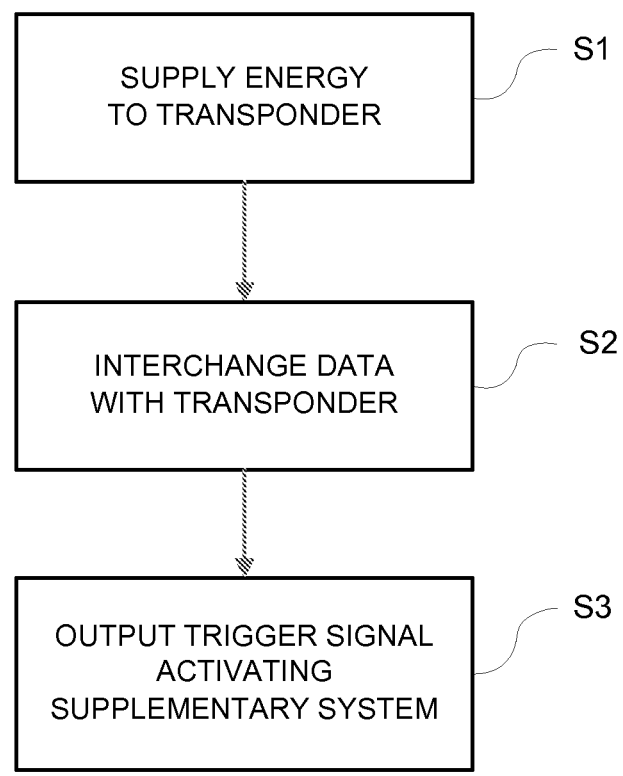
FIG. 3 is a flowchart of an exemplary embodiment of a method for generation of trigger events by RFID labels.

FIG. 3 shows an exemplary embodiment of a method for detecting a label having a transponder for identification by electromagnetic waves (RFID). At S1, energy is supplied to the transponder having a second antenna electromagnetically coupled to a first antenna using a reader electrically connected to the first antenna. At S2, there is interchanging of data with the transponder using the reader, in particular reading data from the transponder, in particular an identification number ID. At S3, a synchronization unit electrically connected to a third antenna electromagnetically coupled to the second antenna outputs a trigger signal for activating a supplementary system on the basis of the occurrence of the data interchange additionally detected using the third antenna.

According to the apparatus and method for detecting a tag having a transponder 8 for identification by electromagnetic waves (RFID) described above, a synchronization unit 3 is electromagnetically coupled to the transponder 8 and outputs a trigger signal 6 for activating a supplementary system 9 on the basis of the occurrence of data interchange with the transponder 8. Any desired supplementary systems 9 can therefore be easily activated and uniquely identified using an identification number of the transponder 8. The activated supplementary systems 9 can generate required data, for example.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An apparatus for detecting a tag, having a transponder with a first antenna, for identification by electromagnetic waves and triggering of a supplementary system, the apparatus comprising:
    second and third antennas electromagnetically coupled together;
    a reader, electrically connected to the second antenna, supplying energy to the transponder via electromagnetic coupling between the first and second antennas and interchanging data with the transponder; and
    a synchronization unit, electrically connected to the third antenna, outputting a trigger signal activating the supplementary system based on occurrence of the data interchange between the transponder and the reader when detected using the third antenna, wherein the supplementary system, during output of the trigger signal, introduces modulation enabling determination of a distance to the reader using the third antenna.

2. The apparatus as claimed in claim 1, wherein the modulation is introduced to the first antenna by the third antenna and by the first antenna to the second antenna.

3. A method for detecting a tag having a transponder for identification by electromagnetic waves, the method comprising:
    supplying energy from a reader, via a first antenna electrically connected to the reader, to the transponder via a second antenna electromagnetically coupled to the first antenna;
    interchanging data with the transponder using the reader;
    outputting, by a synchronization unit electrically connected to a third antenna that is electromagnetically coupled to the second antenna, a trigger signal activating a supplementary system based on occurrence of the data interchange detected using the third antenna; and
    transmitting sensor data from a sensor in the supplementary system to the reader using the third antenna during output of the trigger signal.

4. The method as claimed in claim 3, wherein the synchronization unit acquires contents of the data interchange using the third antenna and outputs the trigger signal based on the contents of the data interchange.

5. The method as claimed in claim 3, wherein the supplementary system, during output of the trigger signal, generates supplementary data acquired by the reader in addition to transponder data from the transponder.

6. The method as claimed in claim 3, wherein the transponder and the supplementary system are mechanically fixed together.

7. The method as claimed in claim 3, wherein the sensor data is transmitted by the third antenna to the second antenna, electrically connected to the transponder, and by the second antenna to the first antenna electrically connected to the reader.

8. The method as claimed in claim 3, wherein the supplementary system, during output of the trigger signal, introduces modulation enabling determination of a distance to the reader using the third antenna.

9. The method as claimed in claim 8, wherein the modulation is introduced to the second antenna by the third antenna and by second antenna to the first antenna.

10. The method as claimed in claim 3, wherein the synchronization unit outputs the trigger signal during the data interchange.

11. The method as claimed in claim 3, wherein the synchronization unit outputs the trigger signal in a delayed manner with respect to the data interchange.

12. The method as claimed in claim 3, wherein the synchronization unit has a diode detector generating a signal and an analog/digital converter sampling the signal generated by the diode detector.

13. The method as claimed in claim 3, wherein the data interchange is reading of the transponder.

14. An apparatus for detecting a tag, having a transponder with a first antenna, for identification by electromagnetic waves and triggering of a supplementary system, the apparatus comprising:
    second and third antennas electromagnetically coupled together;
    a reader, electrically connected to the second antenna, supplying energy to the transponder via electromagnetic coupling between the first and second antennas and interchanging data with the transponder; and
    a synchronization unit, electrically connected to the third antenna, outputting a trigger signal activating the supplementary system based on occurrence of the data interchange between the transponder and the reader when detected using the third antenna, the supplementary system comprising a sensor device transmitting sensor data to the reader via the third antenna during output of the trigger signal.

15. The apparatus as claimed in claim 14, wherein said synchronization unit acquires the data interchange contents using the third antenna and outputs the trigger signal based on the data interchange contents.

16. The apparatus as claimed in claim 14, wherein the supplementary system, during output of the trigger signal, generates supplementary data acquired by the reader in addition to transponder data.

17. The apparatus as claimed in claim 14, wherein the transponder and the supplementary system are mechanically fixed together.

18. The apparatus as claimed in claim 14, wherein the sensor data is transmitted by the third antenna to the first antenna of the transponder and by the first antenna to the second antenna electrically connected to the reader.

19. The apparatus as claimed in claim 14, wherein the synchronization unit outputs the trigger signal during the data interchange.

20. The apparatus as claimed in claim 14, wherein the synchronization unit outputs the trigger signal in a delayed manner with respect to the data interchange.

21. The apparatus as claimed in claim 14, wherein the synchronization unit includes a diode detector generating a signal; and an analog/digital converter sampling the signal generated by the diode detector.

22. The apparatus as claimed in claim 14, wherein the data interchange is reading of the transponder.

* * * * *